United States Patent
Ieda et al.

(10) Patent No.: US 10,450,118 B2
(45) Date of Patent: Oct. 22, 2019

(54) CHEMICAL PRODUCT PACKAGING FILM

(71) Applicant: SEKISUI CHEMICAL CO., LTD., Osaka (JP)

(72) Inventors: Yasuyuki Ieda, Aichi (JP); Hidehiro Yamaguchi, Dallas, TX (US)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/562,027

(22) PCT Filed: Mar. 31, 2016

(86) PCT No.: PCT/JP2016/060711
§ 371 (c)(1),
(2) Date: Sep. 27, 2017

(87) PCT Pub. No.: WO2016/167135
PCT Pub. Date: Oct. 20, 2016

(65) Prior Publication Data
US 2018/0105338 A1    Apr. 19, 2018

Related U.S. Application Data

(63) Continuation-in-part of application No. 14/687,418, filed on Apr. 15, 2015, now abandoned.

(51) Int. Cl.
| | |
|---|---|
| C08J 5/18 | (2006.01) |
| B65D 65/42 | (2006.01) |
| B65D 65/02 | (2006.01) |
| B29C 41/26 | (2006.01) |
| B29C 55/06 | (2006.01) |
| B65D 75/58 | (2006.01) |

(52) U.S. Cl.
CPC ............ *B65D 65/42* (2013.01); *B65D 65/02* (2013.01); *C08J 5/18* (2013.01); *B29C 41/26* (2013.01); *B29C 55/065* (2013.01); *B65D 75/5855* (2013.01); *C08J 2329/04* (2013.01); *C08J 2471/02* (2013.01)

(58) Field of Classification Search
CPC ...... C08F 216/06; C08F 261/04; C08L 29/04; C08L 23/0861; C08L 71/02; C09D 129/04; C08J 2429/04; C08J 2329/04
See application file for complete search history.

(56) References Cited

U.S. PATENT DOCUMENTS

| | | | |
|---|---|---|---|
| 3,296,018 A * | 1/1967 | Sullivan | C09J 7/042 427/207.1 |
| 3,316,190 A * | 4/1967 | Hideo | C08L 29/04 524/48 |
| 3,346,530 A | 10/1967 | Martins | |
| 3,365,413 A | 1/1968 | Monaghan et al. | |
| 3,374,195 A | 3/1968 | Bianco et al. | |
| 5,532,306 A * | 7/1996 | Kauffman | C09J 153/00 524/272 |
| 2009/0291282 A1 | 11/2009 | Kitamura et al. | |

FOREIGN PATENT DOCUMENTS

| | | |
|---|---|---|
| CN | 101679651 | 3/2010 |
| CN | 102731946 | 10/2012 |
| CN | 104356569 | 2/2015 |
| JP | 62-207673 | 9/1987 |
| JP | 2636644 | 7/1997 |
| JP | 2005-206809 | 8/2005 |
| JP | 2006-249407 | 9/2006 |
| JP | 2012-197389 | 10/2012 |
| JP | 2013-47318 | 3/2013 |
| JP | 5638533 | 12/2014 |
| WO | 2006/134657 | 12/2006 |
| WO | 2011/132592 | 10/2011 |
| WO | WO-2011132592 A1 * | 10/2011 ................ C08J 5/18 |

OTHER PUBLICATIONS

International Search Report dated Jun. 28, 2016 in International (PCT) Application No. PCT/JP2016/060711.
International Preliminary Report on Patentability dated Oct. 17, 2017 in International (PCT) Application No. PCT/JP2016/060711.
David R. Karsa, "Industrial Applications of Surfactants IV", Royal Society of Chemistry, 1999, pp. 175, 176, 180 and 181.
Product Information (EMALEX OE-10).
Extended European Search Report dated Nov. 27, 2018 in European Application No. 16779926.1.

* cited by examiner

*Primary Examiner* — Mark S Kaucher
(74) *Attorney, Agent, or Firm* — Wenderoth, Lind & Ponack, L.L.P.

(57) ABSTRACT

Provided is a film for packaging chemicals which does not change in appearance (e.g. yellowing), or does not generate odor, even after long-term storage; which is prevented from being scratched or contaminating rolls when the film is drawn from a roll thereof; and which expresses excellent chemical resistance. Also provided is a film for packaging chemicals which is easily detachable from a heat seal plate when contents are packed and sealed therein. The film for packaging chemicals includes polyvinyl alcohol; and a surfactant, the amount of the surfactant being 0.9% to 5% by mass based on 100% by mass of the polyvinyl alcohol, the surfactant having a polyoxyethylene structure, the number of moles of oxyethylene groups in the surfactant being 5 to 13 mol, the surfactant having a HLB of 9 to 14.5.

5 Claims, No Drawings

CHEMICAL PRODUCT PACKAGING FILM

TECHNICAL FIELD

The present invention relates to a film for packaging chemicals which does not change in appearance (e.g. yellowing), or does not generate odor, even after long-term storage; which is prevented from being scratched or contaminating rolls when the film is drawn from a roll thereof; and which expresses excellent chemical resistance even when the film is used to package a highly active reagent such as an oxidant. The present invention also relates to a film for packaging chemicals which is easily detachable from a heat seal plate when contents are packed and sealed therein.

BACKGROUND ART

Polyvinyl alcohol (hereinafter, also referred to as PVA), which is excellent in transparency, oil resistance, chemical resistance, and gas (e.g. oxygen) barrier properties, has been widely used as a packaging material.

In recent years, PVA has been often used as a packaging material for foods, drugs, industrial chemicals, agrochemicals, or the like whose characteristics are largely affected by oxidation degradation.

In addition, PVA, which is highly water-soluble, has been used as a provisional protection film or sheet to protect products or members. For example, in cases where PVA is used as a provisional protective film in protection of surfaces during metal processing, protection of rubber members during vulcanization, or protection of surfaces of resin molded products, a separating step or disposal step of such a protective film can be skipped because the film can be easily removed by water, warm water, or hot water.

Patent Literature 1, for example, discloses such a PVA film. The film contains several types of specific surfactants and thus has excellent optical properties (significantly suppressed optical stripe or optical color shading) and can show excellent blocking resistance.

Unfortunately, however, a roll of a PVA film containing a surfactant has recently been found to significantly turn yellow after storage for several months at room temperature. Although yellowing of a PVA film has little effect on the properties such as mechanical strength, extensibility, or haze, contents packaged with a PVA film appear yellowish, or a light beam transmitted through a polarizing film including a PVA film as a material appears yellowish. Such appearances may give a bad impression to consumers or users.

Patent Literature 2 discloses a PVA film which contains polyvinyl alcohol and 0.001 to 1 part by mass of a surfactant based on 100 parts by mass of the polyvinyl alcohol, and is controlled to have a pH in a predetermined range when dissolved in water. Such a PVA film is less likely to turn yellow even after storage for several months at room temperature.

CITATION LIST

Patent Literature

Patent Literature 1: JP 2005-206809 A
Patent Literature 2: WO 2011/132592

SUMMARY OF INVENTION

Technical Problem

In such a film, yellowing due to long-term storage can be prevented. However, a film drawn from a roll thereof is rubbed to have poor appearance or contaminates rolls. In cases where chemicals such as agrochemicals or detergents are packaged with such a film and stored for a long period of time, the chemicals may leak from scratches on the film made by rubbing of the films. Further, after a PVA film packaging chemicals is stored for a long period of time, the PVA film problematically generates odor.

Films for packaging chemicals are also used for sealable containers such as pouches or bags. Packing and sealing of contents in these bag-shaped sealable containers is performed by sealing techniques, such as sealing by thermal fusion bonding, sealing by mechanical bonding, sealing with solvents, or sealing with adhesives. The most common technique is thermal fusion bonding. Examples of sealing by thermal fusion bonding include heat sealing, impulse sealing, high frequency sealing, and ultrasonic sealing. In heat sealing, for example, the film for packaging chemicals is made soft and more fluid by heat on a heat seal plate such as a SUS plate, and subjected to pressure bonding. After pressure bonding, the film for packaging chemicals needs to be detached from the heat seal plate. However, the softened film disadvantageously adheres to the heat seal plate and difficult to detach.

The present invention aims to provide a film for packaging chemicals which does not change in appearance (e.g. yellowing), or does not generate odor, even after long-term storage; which is prevented from being scratched or contaminating rolls when the film is drawn from a roll thereof; and which expresses excellent chemical resistance.

The present invention also aims to provide a film for packaging chemicals which is easily detachable from a heat seal plate when contents are packed and sealed therein.

Solution to Problem

The present invention relates to a film for packaging chemicals, including:
polyvinyl alcohol; and
a surfactant,
the amount of the surfactant being 0.9% to 5% by mass based on 100% by mass of the film for packaging chemicals,
the surfactant having a polyoxyethylene structure,
the number of moles of oxyethylene groups in the surfactant being 5 to 13 mol,
the surfactant having a HLB of 9 to 14.5.

The present invention is described in detail below.

The present inventors found that a PVA film can be prepared which does not change in appearance or generate odor for a long period of time and is prevented from being scratched or contaminating rolls when the film is drawn from a roll thereof by adding a surfactant which has a polyoxyethylene structure and in which the number of moles of oxyethylene groups is in a specific range as well as polyvinyl alcohol as components of the PVA film, adjusting the amount of the surfactant to a predetermined range, and adjusting the pH of an aqueous solution of the polyvinyl alcohol film to a predetermined range. The present inventors further found that, when such a PVA film is used to package chemicals as a film for packaging chemicals, the film can suppress leakage of the chemicals or is less likely to generate odor even after long-term storage. Thus, the present invention has been completed.

Components used for a PVA aqueous solution in accordance with the present invention are described in detail below.

(Polyvinyl Alcohol (PVA))

The film for packaging chemicals of the present invention contains polyvinyl alcohol.

The polyvinyl alcohol is a main constitutional component of the film for packaging chemicals of the present invention.

The polyvinyl alcohol is prepared in such a way that a vinyl ester is polymerized to give a polymer, and the polymer is saponified, that is, hydrolyzed, in accordance with a conventionally known method. An alkali or an acid is generally used in saponification. An alkali is preferably used. As the polyvinyl alcohol, only one type of polyvinyl alcohol may be used, or two or more types of polyvinyl alcohols may be used in combination.

Examples of the vinyl ester include vinyl acetate, vinyl formate, vinyl propionate, vinyl butyrate, vinyl pivalate, vinyl versatate, vinyl laurate, vinyl stearate, and vinyl benzoate.

The vinyl ester may be polymerized by any method. Examples of the method include solution polymerization, bulk polymerization, and suspension polymerization.

A polymerization catalyst may be used in polymerization of the vinyl ester, and examples of the polymerization catalyst include 2-ethylhexyl peroxydicarbonate (produced by Tianjin McEIT, "TrigonoxEHP"), 2,2'-azobisisobutyronitrile (AIBN), t-butyl peroxyneodecanoate, bis(4-t-butylcyclohexyl)peroxydicarbonate, di-n-propyl peroxydicarbonate, di-n-butyl peroxydicarbonate, di-cetyl peroxydicarbonate, and di-s-butyl peroxydicarbonate. Each of these polymerization catalysts may be used alone, or two or more of these may be used in combination.

The polymer of the vinyl ester is preferably a polyvinyl ester because the degree of saponification is easily controlled to a favorable range. Further, the polymer of the vinyl ester may be a copolymer of the vinyl ester and other monomers. That is, the polyvinyl alcohol may be formed from a copolymer of the vinyl ester and other monomers. Examples of other monomers, that is, comonomers for copolymerization, include olefins, (meth)acrylic acid and salts thereof, (meth)acrylic acid esters, (meth)acrylamide derivatives, N-vinyl amides, vinyl ethers, nitriles, vinyl halides, allyl compounds, maleic acid and salts thereof, maleic acid esters, itaconic acid and salts thereof, itaconic acid esters, vinyl silyl compounds, and isopropenyl acetate. Each of other monomers may be used alone, or two or more of these may be used in combination.

Examples of the olefins include ethylene, propylene, 1-butene, and isobutene. Examples of the (meth)acrylic acid esters include methyl (meth)acrylate, ethyl (meth)acrylate, n-propyl (meth)acrylate, i-propyl (meth)acrylate, n-butyl (meth)acrylate, and 2-ethylhexyl (meth)acrylate. Examples of the (meth)acrylamide derivatives include acrylamide, n-methyl acrylamide, N-ethyl acrylamide, N,N-dimethyl acrylamide, and (meth)acrylamide propane sulfonic acid and salts thereof. Examples of the N-vinyl amides include N-vinylpyrrolidone. Examples of the vinyl ethers include methyl vinyl ether, ethyl vinyl ether, n-propyl vinyl ether, i-propyl vinyl ether, and n-butyl vinyl ether. Examples of the nitriles include (meth)acrylonitrile. Examples of the vinyl halides include vinyl chloride and vinylidene chloride. Examples of the allyl compounds include allyl acetate and allyl chloride. Examples of the vinyl silyl compounds include vinyl trimethoxy silane.

The lower limit of the degree of saponification of the PVA is preferably 90.0 mol %, and the upper limit thereof is preferably 99.0 mol %.

When the degree of saponification is equal to or more than the lower limit, and equal to or less than the upper limit, the water resistance of the film for packaging chemicals and the dissolution time for releasing chemicals can be easily controlled to improve both the water resistance and the controllability of the dissolution time in a balanced manner.

The lower limit of the degree of saponification of the PVA is more preferably 92.0 mol %, and the upper limit thereof is more preferably 98.0 mol %.

The degree of saponification is measured in accordance with JIS K 6726. The degree of saponification represents the proportion of units actually saponified to vinyl alcohol units in units to be saponified to vinyl alcohol units.

The degree of saponification may be controlled by any method. The degree of saponification can be appropriately controlled depending on saponification conditions, that is, hydrolysis conditions.

The PVA preferably has a standard deviation of distribution of degree of saponification ($\sigma$) of 0.1 to 1.0 mol %.

When the standard deviation of distribution of degree of saponification is equal to or more than the lower limit, and equal to or less than the upper limit, the solubility and the chemical resistance of the film for packaging chemicals are enhanced to increase both the dissolution time for releasing chemicals and the storage period of the film packaging chemicals in a balanced manner.

More preferably, the lower limit of the degree of saponification distribution standard deviation of the PVA is 0.2 mol %, and the upper limit thereof is 0.9 mol %.

The standard deviation of distribution of degree of saponification is an indicator of variation of the degree of saponification in the PVA, and can be measured using FT-IR or the like.

The PVA may have any degree of polymerization. The lower limit of the degree of polymerization of the PVA is preferably 400, more preferably 500, still more preferably 600, particularly preferably 900. The upper limit thereof is preferably 2000, more preferably 1800, still more preferably 1500. When the degree of polymerization is equal to or more than the lower limit, and equal to or less than the upper limit, an aqueous solution with an appropriate viscosity for forming the film for packaging chemicals can be obtained. When the degree of polymerization is equal to or less than the upper limit, the strength of the film for packaging chemicals further increases to impart water resistance. The degree of polymerization is measured in accordance with JIS K 6726.

The lower limit of the viscosity of a 4% by mass aqueous solution of the PVA measured at 20° C. is preferably 3 mPa·s, and the upper limit thereof is preferably 30 mPa·s. When the viscosity is lower than 3 mPa·s, the water resistance may decrease. When the viscosity is higher than 30 mPa·s, the dissolution time may increase. More preferably, the lower limit of the viscosity is 8 mPa·s, and the upper limit thereof is 20 mPa·s.

The viscosity can be measured in accordance with JIS K 6726.

The PVA may be a modified PVA.

The modified PVA is preferably one modified with at least one hydrophilic group selected from the group consisting of a sulfonic acid group, a pyrrolidone ring group, an amino group, and a carboxyl group. In particular, a sulfonic acid group and a pyrrolidone ring group are preferred. The hydrophilic group may include sodium salts, potassium salts, and any other salts, of the functional groups described above.

The modified PVA modified with the hydrophilic group includes a copolymer of an unmodified polyvinyl alcohol with a monomer containing the hydrophilic group, and an unmodified polyvinyl alcohol to which the hydrophilic group is added.

Examples of the modified PVA include a sulfonic acid group-modified polyvinyl alcohol, a pyrrolidone ring-modified polyvinyl alcohol, an amino group-modified polyvinyl alcohol, and a carboxyl group-modified polyvinyl alcohol.

In cases where the modified PVA is a pyrrolidone ring-modified polyvinyl alcohol, the pyrrolidone ring-modified polyvinyl alcohol preferably contains a constitutional unit represented by the formula (1).

[Chem. 1]

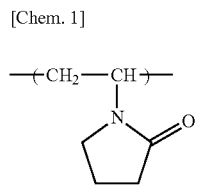
(1)

The sulfonic acid group-modified polyvinyl alcohol may be any polyvinyl alcohol to which a sulfonic acid group is introduced by modification, and preferably has a sulfonic acid group bonded to a polymer main chain through a linking group.

Examples of the linking group include an amide group, an alkylene group, an ester group, and an ether group. In particular, a combination of an amide group and an alkylene group is preferred.

The sulfonic acid group preferably includes a sulfonate, and is particularly preferably a sodium sulfonate group.

In particular, in cases where the modified PVA is a sodium sulfonate-modified polyvinyl alcohol, the sodium sulfonate-modified polyvinyl alcohol preferably has a constitutional unit represented by the formula (2).

[Chem. 2]

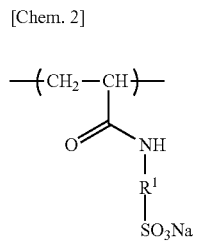
(2)

In the formula (2), $R^1$ represents a C1-C4 alkylene group.

In cases where the modified PVA is an amino group-modified polyvinyl alcohol, the amino group-modified polyvinyl alcohol preferably has a constitutional unit represented by the formula (3).

[Chem. 3]

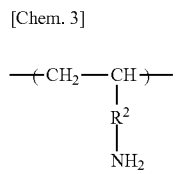
(3)

In the formula (3), $R^2$ represents a single bond or a C1-C10 alkylene group.

In cases where the modified PVA is a carboxyl group-modified polyvinyl alcohol, the carboxyl group-modified polyvinyl alcohol preferably has a constitutional unit represented by the formula (4-1), (4-2), or (4-3).

[Chem. 4]

(4-1)

(4-2)

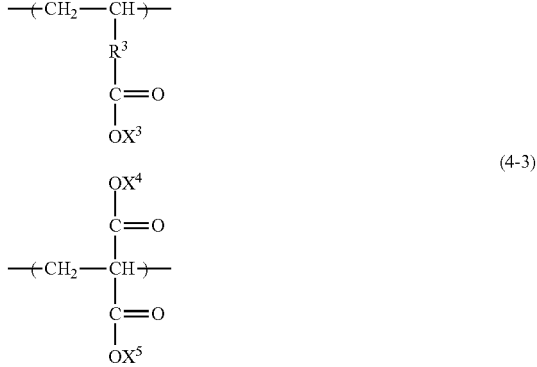
(4-3)

In the formulae (4-1), (4-2), and (4-3), $X^1$, $X^2$, $X^3$, $X^4$, and $X^5$ each independently represent a hydrogen atom, a metal atom, or a methyl group. That is, a carboxyl group in a carboxyl group-containing constitutional unit herein includes a salt of a carboxyl group and a methyl ester of a carboxyl group. Examples of the metal atom include a sodium atom.

In the formula (4-2), $R^3$ represents a C1-C10 alkylene group.

The modified PVA is commercially available as, for example, "KL-318", "KL-118", "KM-618", or "KM-118" (all produced by KURARAY CO., LTD.).

The lower limit of the amount of the constitutional unit having a hydrophilic group in the modified PVA is preferably 0.2 mol %, and the upper limit thereof is preferably 10 mol %. When the amount of the constitutional unit having a hydrophilic group is equal to or more than the lower limit, and equal to or less than the upper limit, a film resistant to chlorine-containing hygiene agents or oxidizing chemicals over a long period of time and free of discoloration or breakage can be obtained.

The lower limit of the amount of the constitutional unit having a hydrophilic group is more preferably 0.5 mol %, and the upper limit thereof is more preferably 8 mol %.

The modified PVA is prepared, for example, by copolymerization of an unmodified polyvinyl alcohol with a hydrophilic group-containing monomer, or addition of a hydrophilic group to an unmodified polyvinyl alcohol.

The lower limit of the amount of the polyvinyl alcohol is preferably 70% by mass, and the upper limit thereof is preferably 97% by mass, in 100% by mass of the film for packaging chemicals of the present invention.

When the amount of the polyvinyl alcohol is equal to or more than the lower limit, a higher-quality film for packaging chemicals in which no bleeding of a plasticizer occurs can be obtained. When the amount of the polyvinyl alcohol is equal to or less than the upper limit, a film for packaging chemicals with higher strength and excellent water resistance can be obtained.

(Surfactant)

The film for packaging chemicals of the present invention contains a surfactant having a polyoxyethylene structure. The "polyoxyethylene structure" as used herein means the structure represented by —($CH_2$—$CH_2$—O)$_n$— where n is 2 or greater.

Examples of the surfactant include anionic surfactants and nonionic surfactants. Nonionic surfactants are preferred because use thereof enables favorable detachability of the film for packaging chemicals from a roll.

Examples of the anionic surfactants include carboxylic acid type anionic surfactants such as potassium laurate, sulfuric acid ester anionic surfactants such as octyl sulfate, and sulfonic acid anionic surfactants such as dodecylbenzenesulfonate.

Examples of the nonionic surfactants include ether nonionic surfactants, ester nonionic surfactants, ester ether nonionic surfactants, amino ether nonionic surfactants, and alkanol amide nonionic surfactants.

Examples of the ether nonionic surfactants include polyoxyethylene alkyl ether, polyoxyethylene alkyl phenyl ether, polyoxyethylene alkyl allyl ether, and polyoxyethylene phenyl ether.

Examples of the polyoxyethylene alkyl ether include polyoxyethylene hexyl ether, polyoxyethylene heptyl ether, polyoxyethylene octyl ether, polyoxyethylene nonyl ether, polyoxyethylene decyl ether, and polyoxyethylene octylnonyl ether.

Examples of the polyoxyethylene alkyl phenyl ether include polyoxyethylene hexylphenyl ether, polyoxyethylene heptylphenyl ether, polyoxyethylene octylphenyl ether, polyoxyethylene nonylphenyl ether, polyoxyethylene decylphenyl ether, and polyoxyethylene dodecylphenyl ether.

Examples of the ester ether nonionic surfactants include polyoxyethylene sorbitan fatty acid ester such as polyoxyethylene sorbitan monolaurate, polyoxyethylene sorbitan monopalmitate, polyoxyethylene sorbitan monostearate, or polyoxyethylene sorbitan monooleate.

Examples of the amino ether nonionic surfactants include polyoxyethylene alkyl amino ether such as polyoxyethylene lauryl amino ether and polyoxyethylene stearyl amino ether.

These surfactants may be used alone or in combination of two or more thereof.

In particular, polyoxyethylene alkyl phenyl ether such as polyoxyethylene octylphenyl ether, polyoxyethylene dodecylphenyl ether, or polyoxyethylene nonylphenyl ether and polyoxyethylene phenyl ether may be particularly preferably used in view of detachability.

The lower limit of the HLB of the surfactant is 9, and the upper limit thereof is 14.5.

When the HLB of the surfactant is equal to or more than the lower limit, and equal to or less than the upper limit, roll contamination is suppressed and the film can be easily detached from the heat seal plate.

The lower limit of the HLB of the surfactant is preferably 12, and the upper limit thereof is preferably 14.

The lower limit of the number of moles of oxyethylene groups in the surfactant is 5, and the upper limit thereof is 13.

The "oxyethylene group" herein means the structure represented by —$CH_2$—$CH_2$—O—. The "number of moles of oxyethylene groups" herein means the number n of oxyethylene groups contained in the surfactant having a polyoxyethylene structure. When a mixture of multiple surfactants containing different numbers of oxyethylene groups is used, the number of moles of oxyethylene groups refers to the average number of oxyethylene groups contained in each molecule of the surfactants containing different numbers of oxyethylene groups.

When the number of moles of oxyethylene groups of the surfactant is equal to or more than the lower limit, and equal to or less than the upper limit, roll contamination is suppressed and the film can be easily detached from the heat seal plate.

The lower limit of the number of moles of oxyethylene groups of the surfactant is preferably 9, and the upper limit thereof is preferably 12.

In the film for packaging chemicals of the present invention, the lower limit of the amount of the surfactant is 0.9%, and the upper limit thereof is 5% by mass based on 100% by mass of the film for packaging chemicals.

When the amount of the surfactant is within the above range, detachability of a formed film or an original solution of a film from a metal surface of a die, a drum, or the like of a film forming device can be improved. In addition, generation of scratches or roll contamination can be suppressed when the film is drawn from a roll thereof. Further, when the amount of the surfactant is within the above range, sufficient chemical resistance can be imparted to the film for packaging chemicals, and the film for packaging chemicals shows sufficient water solubility or visibility even after chemicals are packaged with the film and stored.

The lower limit of the amount of the surfactant is preferably 0.9% by mass, more preferably 1.0% by mass. The upper limit thereof is preferably 4.5% by mass, more preferably 4% by mass.

The film for packaging chemicals of the present invention may further contain a plasticizer.

Films for packaging chemicals, which are transported, stored, or used even in a high-temperature and humidity area or a cold area, need to have high tensile strength or durability. In particular, impact resistance at low temperature is considered to be important. The film for packaging chemicals of the present invention containing a plasticizer can have lower glass-transition temperature, and improved durability at low temperature, and therefore can preferably be used as films for packaging chemicals. Further, the film for packaging chemicals can have a higher water solubility when it contains the plasticizer.

The plasticizer may be any plasticizer commonly used for PVA, and examples thereof include polyhydric alcohols such as glycerin, diglycerin, diethylene glycol, trimethylolpropane, triethylene glycol, dipropylene glycol, or propylene glycol; polyethers such as polyethylene glycol or polypropylene glycol; phenol derivatives such as bisphenol A or bisphenol S; amide compounds such as N-methylpyrrolidone; compounds prepared by adding an ethylene oxide to a polyhydric alcohol such as glycerin, pentaerythritol, or sorbitol; and water. Each of these may be used alone, or two or more of these may be used. Preferably, two or more of these are used.

Among the plasticizers, glycerin, trimethylolpropane, polyethylene glycol, polypropylene glycol, triethylene glycol, dipropylene glycol, and propylene glycol are preferred because they can improve water solubility. In particular, glycerin and trimethylolpropane are preferred because they further improve water solubility.

The lower limit of the molecular weight of the plasticizer is preferably 90, and the upper limit thereof is preferably 1200. The lower limit is more preferably 92, and the upper limit is more preferably 1000.

In the film for packaging chemicals of the present invention, the lower limit of the amount of the plasticizer is preferably 3 parts by mass, and the upper limit thereof is preferably 15 parts by mass, based on 100 parts by mass of the polyvinyl alcohol. When the amount of the plasticizer is less than 3 parts by mass, effects due to addition of the plasticizer may not be obtained. When the amount of the plasticizer is more than 15 parts by mass, bleeding of the plasticizer is increased, which may impair the antiblocking properties of an obtained film for packaging chemicals.

The lower limit of the amount of the plasticizer is more preferably 3.2 parts by mass, and the upper limit thereof is more preferably 13 parts by mass.

The lower limit of the content ratio of the surfactant to the plasticizer (surfactant content/plasticizer content) is preferably 0.1, and the upper limit thereof is preferably 0.9.

Preferably, a 7% by mass aqueous solution of the film for packaging chemicals of the present invention has a pH of 2.0 to 8.0 at 20° C.

When the aqueous solution of the film for packaging chemicals has a pH of the above range, yellowing of the film due to long-term storage can be suppressed.

The lower limit of the pH is more preferably 3, still more preferably 4.5, and the upper limit thereof is more preferably 7.8, still more preferably 7.5.

The pH at 20° C. of the 7% by mass aqueous solution of the film for packaging chemicals of the present invention may be controlled to the range from 2.0 to 8.0 by any method. The pH can be easily controlled by addition of an appropriate amount of an acid material during the production process of the film for packaging chemicals.

Examples of the acid material include, but are not necessarily limited to, organic acids such as lactic acid, succinic acid, adipic acid, benzoic acid, capric acid, citric acid, or lauric acid; inorganic acid materials such as boric acid, potassium dihydrogen phosphate, or sodium dihydrogen phosphate; and amino acids such as aspartic acid or glutamic acid. Each of these acid materials may be used alone, or two or more of these may be used in combination.

Preferably, peel strength between the film for packaging chemicals of the present invention and a SUS plate is less than 0.15 N/15 mm when the film is applied to the SUS plate and heat sealed thereto at 150° C.

When the peel strength is less than 0.15 N/15 mm, the film for packaging chemicals is less likely to adhere to a heat seal plate during packing and sealing of contents in the film for packaging chemicals by heat sealing. The film thus can be easily detached from the heat seal plate, and can exhibit good sealable container formability.

The lower limit of the melting point of the film for packaging chemicals of the present invention is preferably 120° C., and the upper limit thereof is preferably 140° C.

When the melting point is equal to or more than the preferable lower limit, and equal to or less than the preferable upper limit, the film for packaging chemicals is less likely to thermally degrade during packing and sealing of contents in the film for packaging chemicals. The working efficiency of the filling machine is thus improved, and good sealable container formability can be obtained.

The melting point can be measured by differential scanning calorimetry.

The lower limit of the thickness of the film for packaging chemicals of the present invention is preferably 10 μm. The upper limit thereof is preferably 100 μm, more preferably 80 μm, still more preferably 75 μm. When the thickness of the film for packaging chemicals is equal to or more than the lower limit, the strength of the film for packaging chemicals is further increased. When the thickness of the film for packaging chemicals is equal to or less than the upper limit, packaging performance or heat sealing performance of the film for packaging chemicals is further enhanced to reduce the processing time, leading to higher productivity.

The film for packaging chemicals of the present invention may appropriately contain, if necessary, a conventional additive such as a colorant, a flavor ingredient, a bulking agent, a defoaming agent, a remover, or an ultraviolet absorber.

(Method for Manufacturing Film for Packaging Chemicals)

The film for packaging chemicals of the present invention may be manufactured by any method, and may be manufactured by a method in which a PVA aqueous solution containing PVA, a surfactant, and water, and if necessary an additive such as a plasticizer or an acid material is cast on a supporting member, and dried. Specifically, a solution casting method, a roll coating method, a spin coating method, a screen coating method, a fountain coating method, a dipping method, or spraying may be mentioned.

The PVA aqueous solution contains water in addition to the PVA and surfactant. The PVA is mainly dissolved in the water.

In the PVA aqueous solution, the lower limit of the amount of water is preferably 300 parts by mass, more preferably 400 parts by mass, still more preferably 500 parts by mass based on 100 parts by mass of components including the PVA, other than water. Further, the upper limit of the amount of water is preferably 900 parts by mass, more preferably 800 parts by mass, still more preferably 700 parts by mass. When the amount of water is equal to or more than the lower limit, the viscosity of the PVA aqueous solution is appropriately reduced to be easily cast. When the amount of water is equal to or less than the upper limit, the viscosity of the PVA aqueous solution is appropriately increased to be easily cast. Further, the drying time can be further reduced, the orientation of the PVA film can further be enhanced, and a higher-quality film for packaging chemicals can be obtained.

The supporting member is preferably capable of allowing a PVA aqueous solution to remain on the surface thereof when the PVA aqueous solution is cast, and is preferably capable of supporting the film for packaging chemicals. Examples of a material of the supporting member include polyolefins, polyesters, and acrylic resins. The supporting member may be formed from another material. Examples of the polyolefins include ethylene, polypropylene, ethylene-vinyl acetate copolymers, and ethylene-vinyl alcohol copolymers. Examples of the polyesters include polyethylene terephthalate and polyethylene naphthalate. Use of PVA as the material of the supporting member is not preferred.

The PVA aqueous solution cast on the supporting member may be dried by any appropriate method. The solution may be dried naturally, or by heating at a temperature not higher than the glass transition temperature of the modified PVA.

In manufacture of the film for packaging chemicals of the present invention, a stretching step is preferably performed during or after drying. Such a stretching step can preferably provide orientation of the film for packaging chemicals within a predetermined range.

The stretching step is performed by, for example, stretching using a roller, a tenter, or a winder; stretching by drying shrinkage; or stretching by combination of these.

In the stretching step, the stretching ratio is preferably 1.05 to 3 times, more preferably 1.1 to 2.8 times.

Advantageous Effects of Invention

The present invention can provide a film for packaging chemicals which does not change in appearance (e.g. yellowing), or does not generate odor, even after long-term storage; which is prevented from being scratched or contaminating rolls when the film is drawn from a roll thereof; and which has excellent chemical resistance. The present invention also can provide a film for packaging chemicals which is easily detachable from a heat seal plate when contents are packed and sealed therein.

DESCRIPTION OF EMBODIMENTS

In the following, the present invention will be described in more detail based on, but not limited to, examples.

EXAMPLE 1

A 15% by mass aqueous solution of polyvinyl alcohol was prepared by dissolving in water 86.5 parts by mass of a pyrrolidone ring-modified polyvinyl alcohol (degree of polymerization: 1000, degree of saponification: 95.8 mol %, amount of groups modified with a pyrrolidone ring group: 4 mol %, viscosity of a 4% by mass aqueous solution: 10 mPa·s) having a constitutional unit represented by the formula (1), as polyvinyl alcohol; 5.0 parts by mass of glycerin (produced by Wako Pure Chemical Industries, Ltd., molecular weight: 92) and 7.0 parts by mass of trimethylolpropane (produced by Wako Pure Chemical Industries, Ltd., molecular weight: 134) as plasticizers; and 1.5 parts by mass of polyoxyethylene octylphenyl ether (produced by AOKI OIL INDUSTRIAL CO., LTD., blaunon NK-810, HLB: 13.6, the number of moles of oxyethylene groups: 10 mol) as a surfactant.

The resulting PVA aqueous solution was applied to a polyethylene terephthalate (PET) film (thickness: 50 μm), which was a supporting member, by a lip coater, and dried at 70° C. for 10 minutes, and subsequently at 110° C. for 10 minutes. The resulting laminate composed of the supporting member and the film (thickness: 50 μm) for packaging chemicals applied to the member was wound up around a paper core with an inner diameter of 3 inches to give a roll.

EXAMPLE 2

A 15% by mass aqueous solution of polyvinyl alcohol was prepared by dissolving in water 94.2 parts by mass of an unmodified polyvinyl alcohol as polyvinyl alcohol (degree of polymerization: 1300, degree of saponification: 88.0 mol %, viscosity of a 4% by mass aqueous solution: 14 mPa·s); 3.3 parts by mass of glycerin (produced by Wako Pure Chemical Industries, Ltd., molecular weight: 92), 0.8 parts by mass of trimethylolpropane (produced by Wako Pure Chemical Industries, Ltd., molecular weight: 134), and 0.8 parts by mass of polyethylene glycol 600 (produced by Wako Pure Chemical Industries, Ltd., average molecular weight: 600) as plasticizers; and 0.9 parts by mass of polyoxyethylene dodecylphenyl ether (produced by AOKI OIL INDUSTRIAL CO., LTD., blaunon DP-9, HLB: 12, the number of moles of oxyethylene groups: 9 mol) as a surfactant.

A roll of a laminate composed of a supporting member and a film (thickness: 50 μm) for packaging chemicals layered on the member was prepared as in Example 1, except that the resulting PVA aqueous solution was used.

EXAMPLE 3

A 15% by mass aqueous solution of polyvinyl alcohol was prepared by dissolving in water 90.0 parts by mass of a sodium sulfonate-modified polyvinyl alcohol (degree of polymerization: 1200, degree of saponification: 95.4 mol %, amount of groups modified with a sulfonic acid group: 4 mol %, viscosity of a 4% by mass aqueous solution: 12.1 mPa·s), as polyvinyl alcohol, having a constitutional unit represented by the formula (2) in which $R^1$ is a 2-methylene propylene group; 2.7 parts by mass of glycerin (produced by Wako Pure Chemical Industries, Ltd., molecular weight: 92) and 2.7 parts by mass of trimethylolpropane (produced by Wako Pure Chemical Industries, Ltd., molecular weight: 134) as plasticizers; and 4.6 parts by mass of polyoxyethylene octylphenyl ether (produced by AOKI OIL INDUSTRIAL CO., LTD., blaunon NK-810, HLB: 13.6, the number of moles of oxyethylene groups: 10 mol) as a surfactant.

A roll of a laminate composed of a supporting member and a film (thickness: 50 μm) for packaging chemicals layered on the member was prepared as in Example 1, except that the resulting PVA aqueous solution was used.

EXAMPLE 4

A 15% by mass aqueous solution of polyvinyl alcohol was prepared by dissolving in water 91.0 parts by mass of a sodium sulfonate-modified polyvinyl alcohol (degree of polymerization: 1200, degree of saponification: 95.4 mol %, amount of groups modified with a sulfonic acid group: 4 mol %, viscosity of a 4% by mass aqueous solution: 12.1 mPa·s), as polyvinyl alcohol, having a constitutional unit represented by the formula (2) in which $R^1$ is a 2-methylene propylene group; 4.0 parts by mass of trimethylolpropane (produced by Wako Pure Chemical Industries, Ltd., molecular weight: 134) and 2.0 parts by mass of polyethylene glycol 600 (produced by Wako Pure Chemical Industries, Ltd., average molecular weight: 600) as plasticizers; and 3.0 parts by mass of polyoxyethylene nonylphenyl ether (produced by AOKI OIL INDUSTRIAL CO., LTD., blaunon N-510, HLB: 13.3, the number of moles of oxyethylene groups: 10 mol) as a surfactant.

A roll of a laminate composed of a supporting member and a film (thickness: 50 μm) for packaging chemicals layered on the member was prepared as in Example 1, except that the resulting PVA aqueous solution was used.

EXAMPLE 5

A 15% by mass aqueous solution of polyvinyl alcohol was prepared by dissolving in water 90.0 parts by mass of a sodium sulfonate-modified polyvinyl alcohol (degree of polymerization: 1200, degree of saponification: 95.4 mol %, amount of groups modified with a sulfonic acid group: 4 mol %, viscosity of a 4% by mass aqueous solution: 12.1 mPa·s), as polyvinyl alcohol, having a constitutional unit represented by the formula (2) in which $R^1$ is a 2-methylene propylene group; 4.0 parts by mass of trimethylolpropane (produced by Wako Pure Chemical Industries, Ltd., molecular weight: 134) and 2.0 parts by mass of polyethylene glycol 600 (produced by Wako Pure Chemical Industries, Ltd., average molecular weight: 600) as plasticizers; 3.0 parts by mass of citric acid (produced by Wako Pure Chemical Industries, Ltd.) as an acid material; and 1.0 part by mass of polyoxyethylene octylphenyl ether (produced by AOKI OIL INDUSTRIAL CO., LTD., blaunon NK-810, HLB: 13.6, the number of moles of oxyethylene groups: 10 mol) as a surfactant.

A roll of a laminate composed of a supporting member and a film (thickness: 50 μm) for packaging chemicals layered on the member was prepared as in Example 1, except that the resulting PVA aqueous solution was used.

EXAMPLE 6

A 15% by mass aqueous solution of polyvinyl alcohol was prepared by dissolving in water 91.0 parts by mass of a pyrrolidone ring-modified polyvinyl alcohol (degree of polymerization: 1000, degree of saponification: 95.8 mol %, amount of groups modified with a pyrrolidone ring group: 4 mol %, viscosity of a 4% by mass aqueous solution: 10 mPa·s), as polyvinyl alcohol, having a constitutional unit represented by the formula (1); 4.0 parts by mass of trimethylolpropane (produced by Wako Pure Chemical Industries, Ltd., molecular weight: 134) as a plasticizer; 3.8 parts by mass of citric acid (produced by Wako Pure Chemical Industries, Ltd.) as an acid material; and 1.2 parts by mass of polyoxyethylene octylphenyl ether (produced by AOKI OIL INDUSTRIAL CO., LTD., blaunon NK-810, HLB: 13.6, the number of moles of oxyethylene groups: 10 mol) as a surfactant.

A roll of a laminate composed of a supporting member and a film (thickness: 50 μm) for packaging chemicals layered on the member was prepared as in Example 1, except that the resulting PVA aqueous solution was used.

EXAMPLE 7

A roll of a laminate composed of a supporting member and a film (thickness: 50 μm) for packaging chemicals layered on the member was prepared as in Example 4, except that polyoxyethylene dodecylphenyl ether (produced by AOKI OIL INDUSTRIAL CO., LTD., blaunon DP-12, HLB: 13.6, the number of moles of oxyethylene groups: 12 mol) was used as a surfactant.

EXAMPLE 8

A roll of a laminate composed of a supporting member and a film (thickness: 50 μm) for packaging chemicals layered on the member was prepared as in Example 4, except that polyoxyethylene dodecylphenyl ether (produced by AOKI OIL INDUSTRIAL CO., LTD., blaunon DP-5.3, HLB: 9.4, the number of moles of oxyethylene groups: 5.3 mol) was used as a surfactant.

EXAMPLE 9

A roll of a laminate composed of a supporting member and a film (thickness: 50 μm) for packaging chemicals layered on the member was prepared as in Example 4, except that polyoxyethylene phenyl ether (produced by AOKI OIL INDUSTRIAL CO., LTD., blaunon PH-5, HLB: 14.0, the number of moles of oxyethylene groups: 5 mol) was used as a surfactant.

COMPARATIVE EXAMPLE 1

A 15% by mass aqueous solution of polyvinyl alcohol was prepared by dissolving in water 90.2 parts by mass of a sodium sulfonate-modified polyvinyl alcohol (degree of polymerization: 1200, degree of saponification: 95.4 mol %, amount of groups modified with a sulfonic acid group: 4 mol %, viscosity of a 4% by mass aqueous solution: 12.1 mPa·s), as polyvinyl alcohol, having a constitutional unit represented by the formula (2) in which $R^1$ is a 2-methylene propylene group; 4.0 parts by mass of glycerin (produced by Wako Pure Chemical Industries, Ltd., molecular weight: 92), 3.0 parts by mass of trimethylolpropane (produced by Wako Pure Chemical Industries, Ltd., molecular weight: 134), and 2.0 parts by mass of polyethylene glycol 600 (produced by Wako Pure Chemical Industries, Ltd., average molecular weight: 600) as plasticizers; and 0.8 parts by mass of polyoxyethylene dodecylphenyl ether (produced by AOKI OIL INDUSTRIAL CO., LTD., blaunon DP-9, HLB: 12, the number of moles of oxyethylene groups: 9 mol) as a surfactant.

A roll of a laminate composed of a supporting member and a film (thickness: 50 μm) for packaging chemicals layered on the member was obtained as in Example 1, except that the resulting PVA aqueous solution was used.

COMPARATIVE EXAMPLE 2

A 15% by mass aqueous solution of polyvinyl alcohol was prepared by dissolving in water 85.8 parts by mass of a sodium sulfonate-modified polyvinyl alcohol (degree of polymerization: 1200, degree of saponification: 95.4 mol %, amount of groups modified with a sulfonic acid group: 4 mol %, viscosity of a 4% by mass aqueous solution: 12.1 mPa·s), as polyvinyl alcohol, having a constitutional unit represented by the formula (2) in which $R^1$ is a 2-methylene propylene group; 4.0 parts by mass of glycerin (produced by Wako Pure Chemical Industries, Ltd., molecular weight: 92), 3.0 parts by mass of trimethylolpropane (produced by Wako Pure Chemical Industries, Ltd., molecular weight: 134), and 2.0 parts by mass of polyethylene glycol 600 (produced by Wako Pure Chemical Industries, Ltd., average molecular weight: 600) as plasticizers; and 5.2 parts by mass of polyoxyethylene dodecylphenyl ether (produced by AOKI OIL INDUSTRIAL CO., LTD., blaunon DP-9, HLB: 12, the number of moles of oxyethylene groups: 9 mol) as a surfactant.

A roll of a laminate composed of a supporting member and a film (thickness: 50 μm) for packaging chemicals layered on the member was prepared as in Example 1, except that the resulting PVA aqueous solution was used.

COMPARATIVE EXAMPLE 3

A 15% by mass aqueous solution of polyvinyl alcohol was prepared by dissolving in water 96.4 parts by mass of an unmodified polyvinyl alcohol (degree of polymerization: 1300, degree of saponification: 88.0 mol %, viscosity of a 4% by mass aqueous solution: 14 mPa·s) as polyvinyl alcohol; 3.3 parts by mass of glycerin (produced by Wako Pure Chemical Industries, Ltd., molecular weight: 92) as a plasticizer; and 0.3 parts by mass of lauric acid diethanolamide (produced by Wako Pure Chemical Industries, Ltd., HLB: 5.8, the number of moles of oxyethylene groups: 0 mol) as a surfactant.

A roll of a laminate composed of a supporting member and a film (thickness: 50 μm) for packaging chemicals layered on the member was prepared as in Example 1, except that the resulting PVA aqueous solution was used.

COMPARATIVE EXAMPLE 4

A roll of a laminate composed of a supporting member and a film (thickness: 50 μm) for packaging chemicals layered on the member was prepared as in Example 4, except that polyoxyethylene nonylphenyl ether (produced by AOKI OIL INDUSTRIAL CO., LTD., blaunon N-504, HLB: 8.9, the number of moles of oxyethylene groups: 4 mol) was used as a surfactant.

COMPARATIVE EXAMPLE 5

A roll of a laminate composed of a supporting member and a film (thickness: 50 μm) for packaging chemicals layered on the member was prepared as in Example 4, except that polyoxyethylene styrenated phenyl ether (produced by AOKI OIL INDUSTRIAL CO., LTD., blaunon KTSP-16, HLB: 12.7, the number of moles of oxyethylene groups: 16 mol) was used as a surfactant.

COMPARATIVE EXAMPLE 6

A roll of a laminate composed of a supporting member and a film (thickness: 50 μm) for packaging chemicals layered on the member was prepared as in Example 4, except that polyoxyethylene benzyl ether (produced by AOKI OIL INDUSTRIAL CO., LTD., blaunon BA-2, HLB: 9.0, the number of moles of oxyethylene groups: 2 mol) was used as a surfactant.

COMPARATIVE EXAMPLE 7

A roll of a laminate composed of a supporting member and a film (thickness: 50 μm) for packaging chemicals layered on the member was prepared as in Example 4, except that polyoxyethylene β-naphthyl ether (produced by AOKI OIL INDUSTRIAL CO., LTD., blaunon BN-10, HLB: 15.0, the number of moles of oxyethylene groups: 10 mol) was used as a surfactant.

(Evaluation)

The films for packaging chemicals obtained in the examples and the comparative examples were evaluated as follows. Table 2 shows the results.

(1) Measurement of pH of Aqueous Solution of Film for Packaging Chemicals 7 g of the resulting film for packaging chemicals was put into 93 g of deionized water at room temperature, and completely dissolved thereto by heating the water to approximately 90° C. under stirring. The resulting aqueous solution was cooled to 20° C., and the pH of the aqueous solution was measured using a pH meter (produced by METTLER TOLEDO, "MP230").

(2) Measurement of Yellowness Index (ΔYI)

The initial YI value of the resulting film for packaging chemicals was measured using a color and color difference meter (produced by NIPPON DENSHOKU INDUSTRIES CO., LTD., Model "ZE2000").

The resulting film for packaging chemicals was allowed to stand in an environment at 80° C. for 3 days, and further allowed to stand at 23° C.×50% RH for 24 hours. The YI value over time of the film for packaging chemicals was then measured. The yellowness index (ΔYI) was represented by the following equation, and evaluated in accordance with the following criteria.

Yellowness index (ΔYI)=YI value over time−initial YI value

Good (○): ΔYI of lower than 0.8
Bad (×): ΔYI of 0.8 or higher (3) Evaluation of Scratches The resulting film for packaging chemicals was unwound up to 50 meters in length from a 50 mm-width roll in accordance with JIS Z 0237 at an unwound rate of 20 m/min. Presence of scratches on the surface of the film for packaging chemicals was observed using a laser microscope (produced by KEYENCE CORPORATION, VK-8710), and evaluated in accordance with the following criteria.

Good (○): No scratch was observed.
Bad (×): Scratches were observed.

(4) Roll Contamination

The resulting film for packaging chemicals was unwound up to 50 meters in length from a 50 mm-width roll in accordance with JIS Z 0237 at an unwound rate of 20 m/min. Contamination of a metal roll was visually observed and evaluated in accordance with the following criteria. In Comparative Example 2, the film for packaging chemicals adhered to the metal roll due to bleeding of a surfactant on the surface of the film for packaging chemicals, and thus could not be evaluated.

Excellent (○○): No contamination of the roll was observed.
Good (○): Contamination of the roll was slightly observed.
Bad (×): Contamination causing gleaming of the roll was observed, or could not be evaluated.

(5) Leakage of Chemicals

A bag (10 cm×15 cm) was prepared using the resulting film for packaging chemicals. 35 g of calcium hypochlorite was placed in the bag, and the bag was heat sealed. Thus, a packaged body containing chemicals thereinside was obtained. The resulting packaged body was sealed in an aluminum bag, and allowed to stand in an environment at 80° C. for 3 days. After that, the resulting packaged body was allowed to stand in an environment at 23° C.×50% RH for 24 hours, and only the film for packaging chemicals was subjected to an odor sensory test to evaluate leakage of chemicals, and evaluated in accordance with the following criteria.

Good (○): No odor was sensed.
Fair (Δ): Odor was slightly sensed.
Bad (×): Intense odor was sensed.

(6) Chemical Resistance

The resulting film for packaging chemicals was folded in half, and edge portions were heat sealed to prepare a bag with a size of 5 cm×4 cm with one open edge. 25 g of trichloroisocyanuric acid powder was placed in the bag. The open edge of the bag was heat sealed to prepare a packaged body containing trichloroisocyanuric acid powder thereinside. The resulting packaged body was allowed to stand in an environment at 40° C.×90% RH for 24 hours to allow the film to absorb moisture. The packaged body was placed and sealed in a PTFE inner cylindrical sealing container (produced by SANSYO Co., LTD., including a metal valve for SR-50) so as not to disperse water or a plasticizer from the bag. After such a resulting sample was allowed to stand in an oven at a temperature of 70° C. for 1 week, the packaged body was opened to remove contents. Thus, a film for chemical resistance evaluation was prepared, and evaluated for water solubility and visibility after a chemical resistance test.

(6-1) Water Solubility after Chemical Resistance Test

A sample with a size of 30 mm×30 mm was cut from the obtained film for evaluation, and the weight of the sample was measured. The sample was fixed with a jig, and water (500 ml) was poured into a 500 ml-beaker. The sample fixed with a jig was immersed in water in the beaker kept at 23° C. while stirring with a stirrer (with keeping a vortex such that the lowest portion of the vortex reaches to the 400 ml mark). The sample was allowed to stand for 60 minutes, and an obtained aqueous solution was allowed to pass through a mesh filter with an aperture of 300 μm, whose weight was preliminary measured, to separate undissolved gel components. The mesh filter was dried at 80° C. for 3 hours to measure the weight change of the mesh filter. Then, the solubility was calculated from the weight change, and the solubility after a chemical resistance test was evaluated in accordance with the following criteria. The solubilities of the films for packaging chemicals obtained in examples and comparative examples were all 100%.
Good (○): Solubility of 90% or higher
Bad (×): Solubility of lower than 90%

(6-2) Visibility after Chemical Resistance Test

The YI value over time of the obtained sample for evaluation was measured in the same manner as in "(2) Measurement of yellowness index (ΔYI)" using a color and color difference meter (produced by NIPPON DENSHOKU INDUSTRIES CO., LTD., Model "ZE2000"). Thus, a yellowness index (ΔYI) was evaluated in accordance with the following criteria.
Good (○): ΔYI of lower than 5
Bad (×): ΔYI of 5 or higher (7) Detachability The resulting film for packaging chemicals was allowed to stand in an environment at 23° C.×50% RH for 24 hours. The film was then cut into a size of 15 mm×15 cm and applied to a heat seal plate (made of SUS304, thickness: 0.05 mm, 15 mm×10 cm). The film was hot pressed for 1 second with a heat sealer (produced by TESTER SANGYO CO., LTD., TP-701S) at 150° C. and a pressure of 2.8 kgf/cm².

After the hot pressing, the film for packaging chemicals was allowed to stand in an environment at 23° C.×50% RH for 24 hours, and then subjected to a 180° peel test at a peeling rate of 200 mm/min to measure the peel strength from the SUS plate. The detachability from the SUS plate was evaluated in accordance with the following criteria.
Excellent (○○): less than 0.05 N/15 mm
Good (○): 0.05 N/15 mm or more but less than 0.15 N/15 mm
Bad (×): 0.15 N/15 mm or more (8) Melting Point Measurement The melting point of the film for packaging chemicals was measured with a differential scanning calorimeter (produced by Seiko Instruments Inc., EXSTAR-6000) at a rate of temperature rise of 10° C./min.

TABLE 1

| | Composition of aqueous solution of polyvinyl alcohol | | | | | | | | | |
|---|---|---|---|---|---|---|---|---|---|---|
| | Polyvinyl alcohol (PVA) | | | | | Plasticizer (part by mass) | | | Acid material | Surfactant (part by mass) |
| | Degree of polymerization | Degree of saponification (mol %) | Modifying group | Amount of modifying group (mol %) | Viscosity of 4% by aqueous solution (mPa-s) | Addition amount (part by mass) | Glycerin | Trimethylol propane | Polyethylene glycol 600 | (part by mass) Citric acid | Polyoxyethylene octylphenyl ether |
| Ex. 1 | 1000 | 95.8 | Pyrrolidone ring group | 4 | 10 | 86.5 | 5.0 | 7.0 | — | — | 1.5 |
| Ex. 2 | 1300 | 88.0 | — | — | 14 | 94.2 | 3.3 | 0.8 | 0.8 | — | — |
| Ex. 3 | 1200 | 95.4 | Sulfonic acid group | 4 | 12.1 | 90.0 | 2.7 | 2.7 | — | — | 4.6 |
| Ex. 4 | 1200 | 95.4 | Sulfonic acid group | 4 | 12.1 | 91.0 | — | 4.0 | 2.0 | — | — |
| Ex. 5 | 1200 | 95.4 | Sulfonic acid group | 4 | 12.1 | 90.0 | — | 4.0 | 2.0 | 3.0 | 1.0 |
| Ex. 6 | 1000 | 95.8 | Pyrrolidone ring group | 4 | 10 | 91.0 | — | 4.0 | — | 3.8 | 1.2 |
| Ex. 7 | 1200 | 95.4 | Sulfonic acid group | 4 | 12.1 | 91.0 | — | 4.0 | 2.0 | — | — |
| Ex. 8 | 1200 | 95.4 | Sulfonic acid group | 4 | 12.1 | 91.0 | — | 4.0 | 2.0 | — | — |
| Ex. 9 | 1200 | 95.4 | Sulfonic acid group | 4 | 12.1 | 91.0 | — | 4.0 | 2.0 | — | — |
| Comp. Ex. 1 | 1200 | 95.4 | Sulfonic acid group | 4 | 12.1 | 90.2 | 4.0 | 3.0 | 2.0 | — | — |
| Comp. Ex. 2 | 1200 | 95.4 | Sulfonic acid group | 4 | 12.1 | 85.8 | 4.0 | 3.0 | 2.0 | — | — |
| Comp. Ex. 3 | 1300 | 88.0 | — | — | 14 | 96.4 | 3.3 | — | — | — | — |
| Comp. Ex. 4 | 1200 | 95.4 | Sulfonic acid group | 4 | 12.1 | 91.0 | — | 4.0 | 2.0 | — | — |
| Comp. Ex. 5 | 1200 | 95.4 | Sulfonic acid group | 4 | 12.1 | 91.0 | — | 4.0 | 2.0 | — | — |
| Comp. Ex. 8 | 1200 | 95.4 | Sulfonic acid group | 4 | 12.1 | 91.0 | — | 4.0 | 2.0 | — | — |

TABLE 1-continued

| | | | | | | | | | | | |
|---|---|---|---|---|---|---|---|---|---|---|---|
| Comp. Ex. 7 | 1200 | 95.4 | Sulfonic acid group | 4 | 12.1 | 91.0 | — | 4.0 | 2.0 | — | — |

Composition of aqueous solution of polyvinyl alcohol
Surfactant (part by mass)

| | Polyoxy-ethylene dodocylphenyl ether | Polyoxy-ethylene nonylphenyl ether | Lauric acid diethanol amide | Polyoxy-ethylene phenyl ether | Polyoxy-ethylene styrenated phenyl ether | Polyoxy-ethylene benzyl ether | Polyoxy-ethylene β-naphthyl ether | HLB | Number of moles of ethylene groups (mol) | Amount based on 100% by mass of film for packaging chemicals (% by mass) |
|---|---|---|---|---|---|---|---|---|---|---|
| Ex. 1 | — | — | — | — | — | — | — | 13.6 | 10 | 1.5 |
| Ex. 2 | 0.9 | — | — | — | — | — | — | 12 | 9 | 0.9 |
| Ex. 3 | — | — | — | — | — | — | — | 13.6 | 10 | 4.6 |
| Ex. 4 | — | 3.0 | — | — | — | — | — | 13.3 | 10 | 3.0 |
| Ex. 5 | — | — | — | — | — | — | — | 13.6 | 10 | 1.0 |
| Ex. 6 | — | — | — | — | — | — | — | 13.6 | 10 | 1.2 |
| Ex. 7 | 3.0 | — | — | — | — | — | — | 13.6 | 12 | 3.0 |
| Ex. 8 | 3.0 | — | — | — | — | — | — | 9.4 | 5.3 | 3.0 |
| Ex. 9 | — | — | — | 3.0 | — | — | — | 14 | 5 | 3.0 |
| Comp. Ex. 1 | 0.8 | — | — | — | — | — | — | 12 | 9 | 0.8 |
| Comp. Ex. 2 | 5.2 | — | — | — | — | — | — | 12 | 9 | 5.2 |
| Comp. Ex. 3 | — | — | 0.3 | — | — | — | — | 5.8 | 0 | 0.3 |
| Comp. Ex. 4 | — | 3.0 | — | — | — | — | — | 8.9 | 4 | 3.0 |
| Comp. Ex. 5 | — | — | — | — | 3.0 | — | — | 12.7 | 16 | 3.0 |
| Comp. Ex. 8 | — | — | — | — | — | 3.0 | — | 9.0 | 2 | 3.0 |
| Comp. Ex. 7 | — | — | — | — | — | — | 3.0 | 15.0 | 10 | 3.0 |

TABLE 2

| | Evaluation | | | | | | | Chemical resistance | |
|---|---|---|---|---|---|---|---|---|---|
| | | Yellowness index | | | | | | Water solubility after chemical resistance test | |
| | | YI | | | | | Leakage | | |
| | pH | Initial YI | YI over time | Δ YI | Evaluation | Evaluation of scratches | Contamination | of chemicals | Solubility (%) |
| Ex. 1 | 6.9 | 0.7 | 1.1 | 0.4 | ○ | ○ | ○○ | ○ | 93.6 |
| Ex. 2 | 6.8 | 0.9 | 1.5 | 0.6 | ○ | ○ | ○○ | Δ | 92.1 |
| Ex. 3 | 5.9 | 3.4 | 3.9 | 0.5 | ○ | ○ | ○ | ○ | 98.4 |
| Ex. 4 | 6.2 | 3.1 | 3.7 | 0.6 | ○ | ○ | ○○ | ○ | 95.0 |
| Ex. 5 | 4.8 | 2.1 | 2.5 | 0.4 | ○ | ○ | ○○ | ○ | 93.3 |
| Ex. 6 | 3.6 | 0.9 | 1.2 | 0.3 | ○ | ○ | ○○ | ○ | 94.5 |
| Ex. 7 | 6.1 | 3.2 | 3.9 | 0.7 | ○ | ○ | ○ | ○ | 95.0 |
| Ex. 8 | 6.4 | 3.0 | 3.7 | 0.7 | ○ | ○ | ○ | ○ | 94.3 |
| Ex. 9 | 6.2 | 2.9 | 3.5 | 0.6 | ○ | ○ | ○ | ○ | 93.8 |
| Comp. Ex. 1 | 6.0 | 3.2 | 3.8 | 0.6 | ○ | x | ○ | x | 84.6 |
| Comp. Ex. 2 | 6.1 | 2.9 | 3.6 | 0.7 | ○ | x | x | ○ | 95.3 |
| Comp. Ex. 3 | 8.3 | 1.0 | 3.3 | 2.3 | x | ○ | ○○ | Δ | 62.3 |
| Comp. Ex. 4 | 6.2 | 3.1 | 3.8 | 0.7 | ○ | ○ | x | ○ | 94.8 |
| Comp. Ex. 5 | 6.5 | 3.5 | 4.2 | 0.7 | ○ | ○ | x | ○ | 92.5 |

TABLE 2-continued

| | | | | | | | | | | |
|---|---|---|---|---|---|---|---|---|---|---|
| Comp. Ex. 6 | 6.3 | 3.2 | 3.9 | 0.7 | ○ | ○ | x | ○ | | 92.2 |
| Comp. Ex. 7 | 6.3 | 3.2 | 3.9 | 0.7 | ○ | ○ | x | ○ | | 90.2 |

| | Evaluation | | | | | | |
|---|---|---|---|---|---|---|---|
| | Chemical resistance | | | | | Detatchability To SUS | |
| | Water solubility after chemical resistance test | Visibility after chemical resistance test | | | | Peeling strength | | Melting point |
| | Evaluation | Initial YI | YI over time | Δ YI | Evaluation | (N/15 mm) | Evaluation | (° C.) |
| Ex. 1 | ○ | 0.7 | 3.1 | 2.4 | ○ | 0.03 | ○○ | 122 |
| Ex. 2 | ○ | 0.9 | 5.1 | 4.2 | ○ | 0.12 | ○ | 139 |
| Ex. 3 | ○ | 3.4 | 6.7 | 3.3 | ○ | 0.01 | ○○ | 127 |
| Ex. 4 | ○ | 3.1 | 6.3 | 3.2 | ○ | 0.01 | ○○ | 133 |
| Ex. 5 | ○ | 2.1 | 6.5 | 4.4 | ○ | 0.1 | ○ | 138 |
| Ex. 6 | ○ | 0.9 | 3.2 | 2.3 | ○ | 0.06 | ○ | 130 |
| Ex. 7 | ○ | 3.7 | 7.5 | 3.8 | ○ | 0.03 | ○○ | 135 |
| Ex. 8 | ○ | 3.1 | 6.6 | 3.5 | ○ | 0.08 | ○ | 132 |
| Ex. 9 | ○ | 3.0 | 6.6 | 3.6 | ○ | 0.06 | ○ | 132 |
| Comp. Ex. 1 | x | 3.2 | 7.2 | 4.0 | ○ | 0.15 | x | 128 |
| Comp. Ex. 2 | ○ | 2.9 | 6.7 | 3.8 | ○ | 0.01 | ○○ | 115 |
| Comp. Ex. 3 | x | 1.0 | 10.3 | 9.3 | x | 0.21 | x | 143 |
| Comp. Ex. 4 | ○ | 3.2 | 6.5 | 3.3 | ○ | 0.13 | ○ | 131 |
| Comp. Ex. 5 | ○ | 3.5 | 9.8 | 6.3 | x | 0.18 | x | 135 |
| Comp. Ex. 6 | ○ | 3.2 | 6.6 | 3.4 | ○ | 0.16 | x | 134 |
| Comp. Ex. 7 | ○ | 3.2 | 10.1 | 6.9 | x | 0.15 | x | 131 |

INDUSTRIAL APPLICABILITY

The present invention can provide a film for packaging chemicals which does not change in appearance (e.g. yellowing), or does not generate odor, even after long-term storage; which is prevented from being scratched or contaminating rolls when the film is drawn from a roll thereof; and which has excellent chemical resistance. The present invention can also provide a film for packaging chemicals which is easily detachable from a heat seal plate when contents are packed and sealed therein.

The invention claimed is:

1. A film for packaging chemicals, comprising:
polyvinyl alcohol; and
a nonionic surfactant,
wherein,
the amount of the surfactant is 0.9% to 4.6% by mass based on 100% by mass of the film for packaging chemicals,
the surfactant is a polyoxyethylene alkyl phenyl ether,
the number of moles of oxyethylene groups in the surfactant is 5 to 13 mol,
the surfactant has a HLB of 9 to 14.5,
the polyvinyl alcohol is modified by at least one hydrophilic group selected from the group consisting of a sulfonic acid groups, a pyrrolidone ring group, an amino group, and a carboxyl group, and
a peel strength between the film and a SUS plate is less than 0.15 N/15 mm when the film is heat sealed to the SUS plate at 150° C.

2. The film for packaging chemicals according to claim 1, wherein a 7% by mass aqueous solution of the film has a pH of 2.0 to 8.0 at 20° C.

3. The film for packaging chemicals according to claim 1, further comprising a plasticizer in an amount of 3 to 15 parts by mass based on 100 parts by mass of the polyvinyl alcohol.

4. The film for packaging chemicals according to claim 1, wherein the polyvinyl alcohol has a degree of saponification of 90 mol % or higher.

5. The film for packaging chemicals according to claim 1, wherein the amount of a constitutional unit having a hydrophilic group is 0.2 to 10 mol %.

* * * * *